J. P. LAVIGNE.
VALVE
APPLICATION FILED OCT. 19, 1908.

945,556.

Patented Jan. 4, 1910.

WITNESSES:

INVENTOR
Joseph P. Lavigne
BY
ATTORNEYS

UNITED STATES PATENT OFFICE.

JOSEPH P. LAVIGNE, OF DETROIT, MICHIGAN.

VALVE.

945,556.

Specification of Letters Patent.

Patented Jan. 4, 1910.

Application filed October 19, 1908. Serial No. 458,382.

*To all whom it may concern:*

Be it known that I, JOSEPH P. LAVIGNE, a citizen of the United States of America, residing at Detroit, in the county of Wayne and State of Michigan, have invented certain new and useful Improvements in Valves, of which the following is a specification, reference being had therein to the accompanying drawings.

This invention relates to improvements in valves and more particularly to improved means for preventing leakage around the outwardly extending stems of radiator and similar valves.

The invention consists in the construction, arrangement and combination of parts as hereinafter more fully set forth, and particularly pointed out in the claims, reference being had to the accompanying drawings, in which:—

Figure 1:
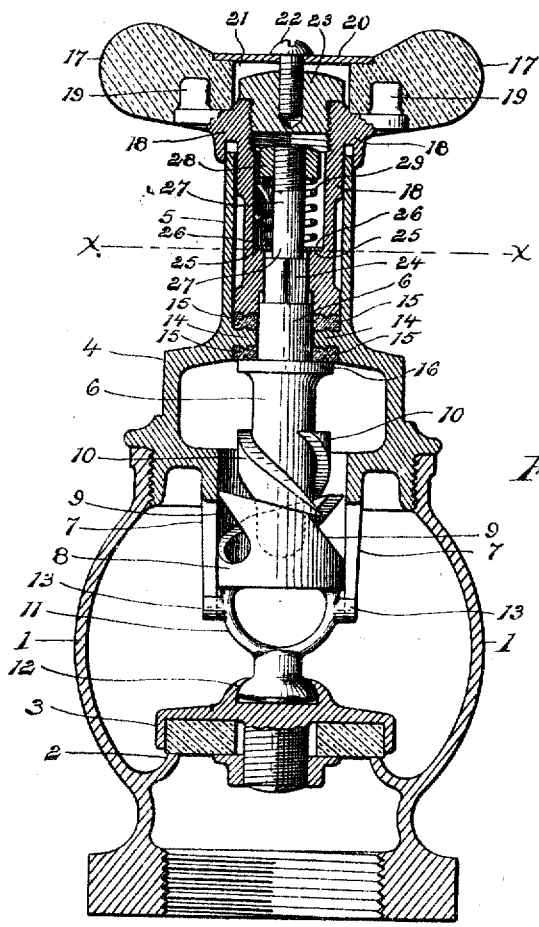
Figure 2:
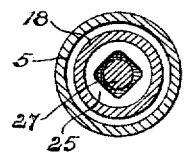

Figure 1 is a transverse vertical section of a device embodying the invention; and Fig. 2 a horizontal section of the same on the line x—x.

In the drawing, the invention is shown as applied to a valve construction embodying peculiar means for operating the valve disk for which I have made application for Letters Patent, dated March 23, 1908, Serial No. 422,851 but I do not wish to limit myself to such combination, as this invention may be applied to any valve having a rotatable outwardly extending stem.

As shown in the drawing 1 is a suitable globular casing having a valve seat 2 around the open inlet end of the casing for a disk valve 3 of any desired form. Screwed into the top of the casing is a plug or bonnet 4 having an outwardly extending tubular portion 5 within which the outwardly extending valve stem 6 is located, and an inwardly extending tubular portion 7 which forms a guide for a cam member 8 having cam surfaces and slots 9 to engage projecting cam members 10 on the valve stem having similar surfaces. The member 8 is formed with a yoke 11 to which the disk 3 is attached by a universal joint 12 and said yoke is provided with studs 13 to engage guide slots in the tubular guide 7 and prevent said member and disk from turning when the stem is turned to engage the cam projections on the stem with the slots in the cam member 8 and lift the disk from its seat.

Near the inner open end of the tubular member 5 is an inwardly extending wall or ledge 14 which forms seats at its upper and lower sides for packing rings 15 of any suitable material and a flange 16 on the valve stem 6 engages the lower side of the lower ring, clamping it between said flange and its seat.

17 is a hand wheel of wood or other suitable material which is secured to the upper end of a tubular shank 18 by lugs 19 on the shank projecting upward into the wood, the wheel being held in place upon the lugs by a disk 20 engaging the upper side of the wheel and said disk being secured in place over an axial opening 21 in the wheel by a screw 22 passing through the disk and engaging a screw-threaded opening in the axis of a plug 23 screwed into the upper end of the tubular shank. This shank extends downward within the tubular portion 5 of the bonnet and at its inner end seats upon the upper packing ring 15. The bore of the lower end of said shank is square in cross-section and the valve stem 6 at 24 is formed to fit said bore so that when the shank is turned by means of the hand wheel the stem will be turned also. The diameter of the bore of said shank is increased at the outer end of its squared portion, forming a seat 25 for a washer 26 seated thereon within the bore, and a reduced end 27 on the valve stem extends upward in the shank through said washer and is screw-threaded at its upper end to receive a nut 28 between which nut and washer a coiled spring 29 is sleeved thereon. Said spring 29 exerts a force to hold the flange 16 in contact with the lower packing ring 15 and the lower end of the shank in contact with the upper ring, thus clamping said rings to their seats and forming a tight gland. The operation of the spring is not interfered with by the turning of the hand wheel as the stem and shank turn together and carry said spring.

What I claim as my invention is:—

1. The combination with a casing having a valve seat, a valve disk to engage said seat and a stem to operate said disk, of a tubular member within which the stem projects and slides and is adapted to be turned thereby, a hand wheel on the outer end of said member, a seat surrounding said stem, a flange on the stem to engage said seat at its lower side, a shoulder on the outer end of the stem wholly within the tubular member and a spring sleeved on the stem engaging the shoulder on the outer end on said stem for holding the spring thereon and engaging said tubular member at its inner end.

2. The combination with a casing having a valve seat and a valve disk to engage said seat, of a tubular extension on the casing, a seat within said tubular extension, a valve stem for operating said disk extending outward in the extension past said seat and provided with means for engaging the inner side of said seat, a hand wheel, a tubular shank to which the hand wheel is secured and extending within the tubular extension into engagement with the upper side of said seat and adapted to engage and turn the stem, a nut on the outer end of said stem wholly within the tubular member and a spring sleeved on the stem between said nut and said shank.

3. The combination with a casing having a valve seat and a valve disk to engage said seat, of a valve stem to operate the disk having a portion which is square in cross-section, a member having a seat surrounding said stem, a hand wheel, a tubular shank to which the wheel is secured, said shank being formed to engage and fit the squared portion of said stem and adapted to engage said seat at its lower end, a flange on the stem to engage the opposite side of said seat, a washer in the bore of said shank engaging a seat therein and through which washer the stem extends, a nut on the outer end of said stem wholly within the tubular member and a coiled spring sleeved on the stem between said washer and nut.

4. The combination with a casing having a valve seat and a valve disk to engage said seat, of a bonnet on the casing having a tubular extension, a valve stem to operate the disk extending outward in the tubular extension, a seat in said extension surrounding the stem, a flange on the stem to engage the inner side of said seat, a hand wheel having an axial opening, a tubular shank extending within the extension and engaging the outer side of the seat thereon and engaging the stem to turn the same, a nut on the outer end of the stem, a coiled spring on the stem between the nut and a shoulder on the shank, a plug in the outer end of said shank, a disk engaging the outer side of the wheel and covering its axial opening, lugs on the shank engaging the wheel, and a screw extending through the disk and engaging a screw threaded opening in the plug.

In testimony whereof I affix my signature in presence of two witnesses.

JOSEPH P. LAVIGNE.

Witnesses:
OTTO. F. BARTHEL,
ANNA M. DORR.